United States Patent
Sharma et al.

(10) Patent No.: US 10,922,727 B2
(45) Date of Patent: Feb. 16, 2021

(54) SYSTEM AND METHOD FOR AUTOMATED DISTRIBUTION TO SELECTED MULTIPLE RECEIVERS

(71) Applicant: MASTERCARD INTERNATIONAL INCORPORATED, Purchase, NY (US)

(72) Inventors: Prashant Sharma, Madison, NJ (US); Antonio Marra, Fishkill, NY (US); Manash Bhattacharjee, Jersey City, NJ (US)

(73) Assignee: Mastercard International Incorporated, Purchase, NY (US)

( * ) Notice: Subject to any disclaimer, the term of this patent is extended or adjusted under 35 U.S.C. 154(b) by 389 days.

(21) Appl. No.: 15/689,789

(22) Filed: Aug. 29, 2017

(65) Prior Publication Data
US 2019/0066174 A1 Feb. 28, 2019

(51) Int. Cl.
G06Q 30/06 (2012.01)
G06K 7/14 (2006.01)
G06Q 50/12 (2012.01)

(52) U.S. Cl.
CPC ..... *G06Q 30/0609* (2013.01); *G06Q 30/0635* (2013.01); *G06K 7/1417* (2013.01); *G06Q 50/12* (2013.01)

(58) Field of Classification Search
USPC ...................................................... 705/26.35
See application file for complete search history.

(56) References Cited

U.S. PATENT DOCUMENTS

| | | | | |
|---|---|---|---|---|
| 9,037,491 | B1* | 5/2015 | Lee | G06Q 20/204 705/17 |
| 9,741,050 | B2* | 8/2017 | Stepanovich | G06Q 30/0214 |
| 2002/0138363 | A1* | 9/2002 | Karas | G06Q 20/02 705/26.35 |
| 2012/0284174 | A1* | 11/2012 | Bentley | G06Q 30/02 705/39 |
| 2012/0310779 | A1* | 12/2012 | Flynn | G06Q 50/34 705/26.43 |
| 2013/0290173 | A1* | 10/2013 | Nemeroff | G06Q 20/26 705/39 |
| 2015/0161589 | A1* | 6/2015 | Snider | G06Q 20/3276 705/44 |

(Continued)

OTHER PUBLICATIONS

Lynn, Michael, and Jeffrey Graves. "Tipping: an incentive/reward for service?." Hospitality Research Journal 20.1 (1996): 1-14. (Year: 1996).*

(Continued)

*Primary Examiner* — Michelle T Kringen
(74) *Attorney, Agent, or Firm* — Michael Best & Friedrich LLP

(57) ABSTRACT

Embodiments relate to a system, method and medium for facilitating automated distribution of a stated item to two or more receivers, where each of the receivers are associated with one or more entities. A selection device receives information indicating the receivers authorized to receive a stated item. The selection device is used to select which of multiple authorized receivers are to receive the stated item. Once the selector has made the selections, a stated item in a quantity determined by the selector is directed to the selected receivers.

20 Claims, 5 Drawing Sheets

(56) References Cited

U.S. PATENT DOCUMENTS

| | | | |
|---|---|---|---|
| 2015/0169709 A1* | 6/2015 | Kara | G06Q 10/0639 |
| | | | 707/736 |
| 2015/0356548 A1* | 12/2015 | Luna-Rodriguez | ......................... |
| | | | G06Q 20/3224 |
| | | | 705/39 |
| 2016/0379201 A1 | 12/2016 | Sabet et al. | |
| 2017/0132584 A1 | 5/2017 | Birukov et al. | |
| 2017/0178165 A1 | 6/2017 | Davey-Rogers et al. | |
| 2018/0240203 A1* | 8/2018 | Cronin | G06Q 10/063114 |

OTHER PUBLICATIONS

U.S. Appl. No. 15/296,644, "Systems and Methods for Generating Aggregated Merchant Analytics for a Geographic Sector Using Tip Data," filed Oct. 18, 2016, 68 pages.

\* cited by examiner

Select a Specific Receiver or Category to Receive a Stated Item

- Joe Green
- Molly Brown
- Bill Smith
- Jill Mead
- Maid
- Concierge
- Bell Person
- Porter

202

204

Select a frequency

- One Time
- Daily
- Other Time Period (as specified)

206

Select an amount _____

208

Checkout?

- Add Another Receiver/category
- Finish and Send

SYSTEM AND METHOD FOR AUTOMATED DISTRIBUTION TO SELECTED MULTIPLE RECEIVERS

SUMMARY

Embodiments relate to a system, method and medium for facilitating automated distribution of a stated item to two or more receivers, where each of the receivers are associated with one or more entities. A selection device receives information indicating the receivers authorized to receive a stated item. The selection device is used to select which of multiple authorized receivers are to receive the stated item. Once the selector has made the selections, a stated item in a quantity determined by the selector is directed to the selected receivers.

In embodiments, a platform for facilitating automated distribution of a stated item to a plurality of authorized receivers associated with an entity is disclosed including software that, when executed by a processor, facilitates receiving, from an entity input device, at least one of a category of receiver and two or more authorized receivers authorized to receive the stated item; generating a first signal, receivable by a selection device, for conveying a selection option set containing at least one of the category of receiver and the two or more authorized receivers; receiving, from the selection device, a second signal indicating a selection from the selection option set of at least one of the category of receiver and two of the at least two authorized receivers, where the category of receiver is selected, identifying the selected authorized receiver associated with the selected category, and wherein a quantity of the stated item conveyed by the selection device corresponding to each selected authorized receiver is identified; and communicating, for each selected authorized receiver, the quantity of the stated item conveyed by the selection device to a stated item repository corresponding to each selected authorized receiver.

Also in embodiments, a computer-based method for facilitating automated distribution of a stated item to a plurality of receivers associated with an entity is disclosed, including receiving an enrollment signal from a selection device to enroll at least one of the selection device and a selector, the enrollment signal containing a unique identifier; generating a database containing two or more authorized receivers, wherein the authorized receivers are a subset of the plurality of receivers associated with the entity; generating a first signal, receivable by a selection device, for conveying a selection option set containing at least the two or more authorized receivers; receiving, from the selection device, a second signal indicating the selection from the selection option set of the at least two authorized receivers, wherein an amount of the stated item conveyed by the selection device and corresponding to each selected authorized receiver is identified; and communicating, for each selected authorized receiver, the quantity of the stated item conveyed by the selection device to a stated item repository corresponding to each selected authorized receiver.

BRIEF DESCRIPTION OF THE FIGURES

FIG. 2 depicts an example display for selecting receivers in accordance with embodiments.

DETAILED DESCRIPTION OF THE EMBODIMENTS

Embodiments relate to a system, method and medium for facilitating automated distribution of stated items to multiple receivers in an automated fashion, where each of the receivers is associated with one or more entities. In embodiments, a selector first enrolls a selection device with an entity by providing identifying information to facilitate the enrollment. A platform interface is then sent/downloaded to the selection device. The selection device is then able to receive information indicating which receivers are authorized to receive the stated items. The receipt of this information can be initiated, e.g., by an action of the selector (e.g., by the selector scanning a video screen) or by the entity when, e.g., an action is completed by a receiver for which they are authorized to receive the stated item. In either situation, the selection device can be used to select which of the multiple authorized receivers are to receive the stated item. Once the selector has made the selections, a stated item in whatever amount is determined by the selector is sent to the selected receivers. In addition, embodiments envision that comparisons among, e.g., the amount of stated items received by individual receivers as well as entities can also be implemented.

Figure 1:
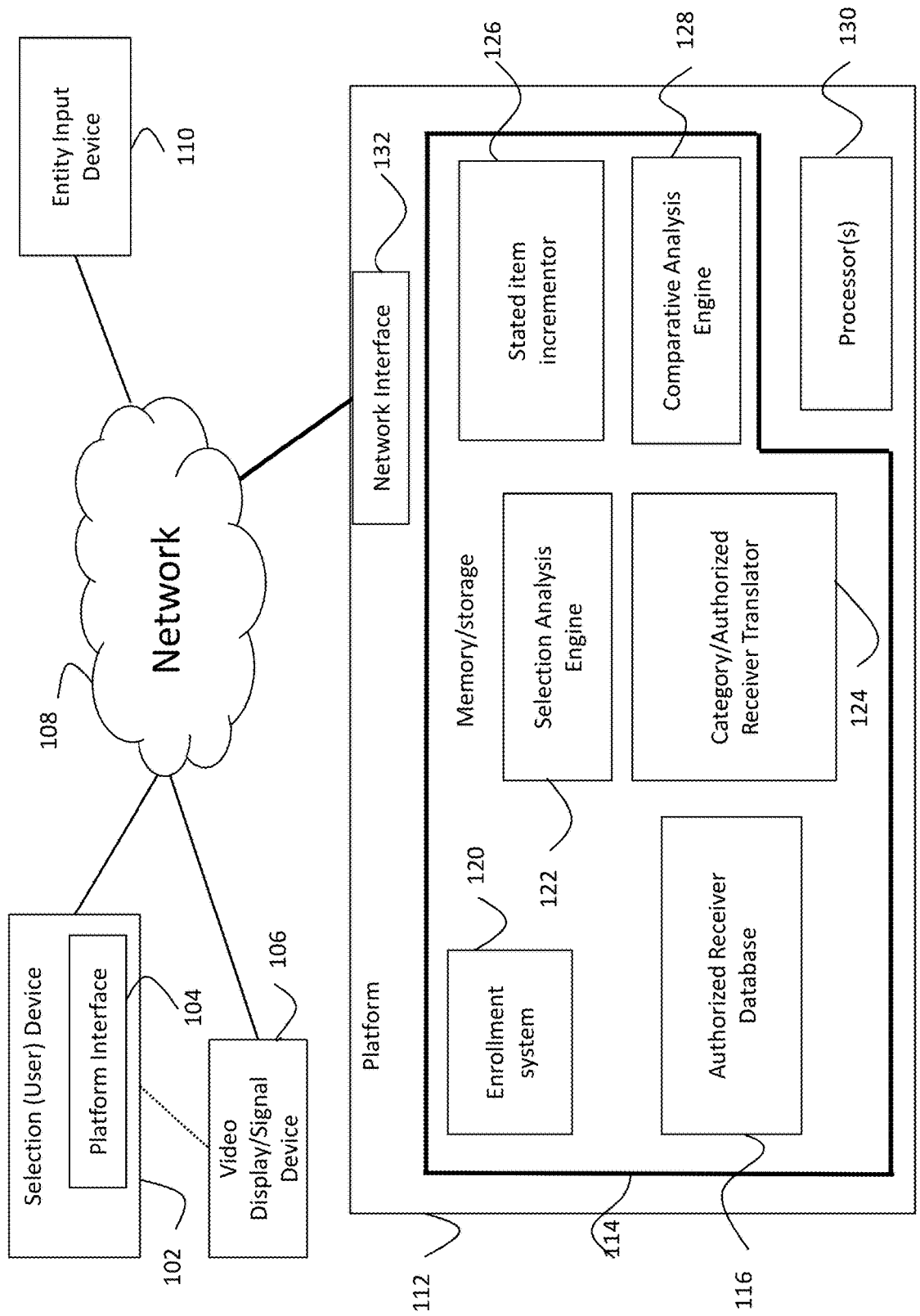
FIG. 1 depicts a block diagram of a platform for generating and selecting receivers in accordance with embodiments.

Embodiments are now described with regard to FIG. 1. In general, a platform 112 for implementing aspects of embodiments is operated or controlled in whole or part by an entity (not shown) which can be a facility such as a hotel employing multiple persons who often will receive some type of stated item such as cash or other item of value in the course of their employment. An entity input device 110 can be used to enter information relating to the receivers that are authorized to receive a stated item. Entity input device 110 can also be used to enter information such as multiple categories of employees (e.g., entity employees such as maids, waiters, porters, etc.) as will be discussed further below. In embodiments, additional information such as a timeframe when a receiver is on duty and the location that the receiver worked (e.g., the specific rooms that a maid had worked in) can also be entered by entity input device 110. This allows a selector (e.g., a hotel guest) to provide an authorized receiver such as a maid with a stated item without knowing the receiver's precise identity. The information from the entity input device 110 then is received by a network interface 132 of a platform 112 via a network 108. The platform 112 manages many of the aspects of embodiments as will be described further herein.

It should be understood that entity input device 110 can be a mechanism that is, for example, part of or in communication with preexisting entity payroll and/or scheduling systems and can feed the appropriate information into platform 112.

Once received by the network interface 132, the information relating to the authorized receivers is then stored in an authorized receiver database.

When a selector such as a hotel guest checks into a hotel, they can enroll with an entity/hotel's receiver selection program by, e.g., accessing a URL from their selection device 102 (e.g., cell phone or computer) and requesting an app (platform interface 104) which is then forwarded to the selection device 102. The site being accessed may first request additional information such as the guest's name and personal account number or other credit card-related information, or may ask the user to first download the platform interface 104 after which additional identifying information can be requested. Either way, the platform interface 104 allows the guest/selector to communicate with aspects of the platform 112 for selecting receivers to receive stated items. (An enrollment system 120 is also shown as part of the platform 112 though, like other aspects of the platform, it can also be implemented separately therefrom.)

Once the guest is enrolled, they can then begin selecting multiple receivers who are authorized (by the entity) to receive stated items. In embodiments, this can be initiated in any number of ways. In one example where a hotel guest is concerned, the guest can activate a particular channel on the television in their room where a scanable code (e.g., a QR code), or other identifying code (i.e., a numeric, alphanumeric, or other type of code) can be found. The guest can then scan the code with their selection device 102 (or otherwise enter the code into their selection device 102) to obtain information from the platform 112 indicating receivers whom they can select to receive stated items. More specifically, in embodiments, the scanable code either itself contains this information and/or the act of scanning the code signals the platform interface 104 to then obtain this information from the platform 112. In another example, the aforementioned initiation can also occur when the entity receives an indication that the receiver completed an action for which they are authorized to receive a stated item, such as where a porter has finished delivering luggage to a guest's room.

In embodiments, a set of authorized receivers from the authorized receiver database 116 is then forwarded to the guest's selection device 102 from platform 112. In embodiments, the set of authorized receivers can be custom-generated by the platform 112 (or entity input device 110) for a particular selector or group of selectors. For example, if a particular porter is generally an authorized receiver but is on vacation the week the guest is visiting the hotel, the porter would be omitted from the set of receivers that the guest receives for possible selection. In another example, the selector might have, as part of the set, a receiver that works in the spa only if the selector had visited the spa.

In addition to generating a particular set of authorized users for the guest, in embodiments, certain categories can also be generated for selection as appropriate. For example, the guest may not know the identity of the maid or the porter (where, e.g., the guest was not present in the room when the luggage arrived) yet may want to provide them with a stated item. In that situation, a selector can simply select a given category (e.g., "maid") and the appropriate maid would receive a stated item. In addition, the categories could be generated based on the situation of the particular guest (e.g., some guests choose not to have maid service to obtain additional benefits from the hotel, and for those situations, the guest would not be given the option to select a maid.)

Once a set of authorized receivers and categories (collectively, a selection option set) is conveyed to the selector's selection device 102 as a first signal via the platform interface 104, the selector can review the options and choose one or more receivers (or categories) to receive stated items, as desired. (An example screen for making this selection will be discussed further below in conjunction with FIG. 2.) Once the selector has made their selection via the selection device 102, the platform interface 104 forwards the selections to the platform 112 via a second signal where it is processed by the selection analysis engine 122. The selection analysis engine 122 analyzes the selection and determines any next steps toward implementing the intent of the selector in view of the selections made. For example, where a selector selects two specific receivers to receive a stated amount, the selection analysis engine 122 will send the appropriate information to a stated item incrementor 126 which will request, e.g., an account such as a bank account of each receiver to be incremented by that stated amount. (In embodiments, other stated items aside from cash could also be selected for receipt by an authorized receiver.) The selection analysis engine 122, using the guests' primary/personal account number (PAN) stored in the enrollment system 120, also can cause the total amount to be deducted from a credit or debit card belonging to the selector, or cause a charge to be credited to a hotel account (e.g., associated with a room number of the guest). Further, if the guest chooses that a receiver receive a stated item on a periodic basis, selection analysis engine 122 facilitates initiating a routine to provide the receiver with the stated item on the selected periodic basis.

Where a selector chooses a particular category of receiver such as a maid, the selection analysis engine 122 utilizes the category/authorized receiver translator 124 to determine the identity of the maid. Assume, for example, a hotel guest is in room 1324 and a particular maid makes up his room on Tuesday. In embodiments, the category/authorized receiver translator 124 has access to the schedule of the maids (which could reside in, e.g., authorized receiver database 116 or elsewhere) and determines which maid made up room 324 on Tuesday. It then conveys that information to selection analysis engine 122 which then processes that information in the manner described above.

In this way, as described above, a selector can convey stated items to multiple receivers as well as to receivers that s/he has not come into direct contact with and at the same time be assured that each receiver is apportioned the full and fair amount for their actions based on the selector's intent. As shown in FIG. 1, aspects of the platform 112 may include computer readable instructions that are within a memory/storage 114 residing in one or more computers (not shown) and are executed by processor(s) 130. In general, it should be understood that the aforementioned components are described by way of example, and that embodiments can be implemented in any number of different ways using various components.

In embodiments, processor(s) 130 may represent one or more digital processors. Memory/storage 114 may represent one or both of volatile memory (e.g., RAM, DRAM, and SRAM, and so on) and non-volatile memory (e.g., ROM, EPROM, EEPROM, Flash memory, magnetic storage, optical storage, network storage, and so on). Memory/storage 114 includes machine readable instructions that are executed by processor(s) 130 to provide the functional aspects of platform 112 as described herein. Platform 112 or aspects thereof may be part of a card institution such as MasterCard or in communication with such an institution.

Embodiments also can include a comparative analysis engine 128 which contains or has access to the amount/quantity of stated items accumulated by each receiver and can compare each receiver to other receivers (individually or cumulatively) over a given period of time. In embodiments, these results can be displayed. Depending on other factors which may be present, this can be an indication of how well a receiver satisfies selectors (e.g., guests, etc.). In embodiments, a receiver can also be tracked in this manner if they work for multiple entities or sub-entities (e.g., they may work at multiple hotels in a given week).

In addition, in embodiments, comparative analysis engine 128 can compare an entity to other entities as long as the relevant cumulative information is accessible by platform 112. Thus, for example, the average amount of stated items provided by guests at hotel A over a given period of time can be compared with those provided by guests of hotel B.

FIG. 2 represents an example of a video screen that can be generated for display at the selection device 102 based on information from authorized receiver database 116. In this example, particular receivers 202 and/or categories 204 can be selected to receive a stated item. Such categories 204 can include maid, concierge, bell person or porter. A frequency 206 can also be selected, which can indicate that the stated item is being given on a one-time basis or at a periodic frequency which can be daily or some other time period specified by the selector. An amount 208 of the stated item is also selected, which can be an open-ended amount as shown in FIG. 2. In embodiments, it can also be pre-set amounts which can be chosen by the selector. Though not shown, in embodiments, it is envisioned that the stated item selected for receipt by a selected receiver can be any number of different types of items considered of value.

The selector can then choose to add another receiver or category to receive a stated item or to finish with the screen and send his selections to the selection analysis engine 122 of platform 112, as generally shown at 210. Though not shown herein, in embodiments, there can also be an option allowing a selector to review all of his selections before finishing and sending the selections to platform 112.

It should be understood that FIG. 2 is by way of example and that any number of different ways are also envisioned to select receivers by use of the selection device 102. In addition, it should be seen that the embodiments described herein allow a selector (e.g., guest) to provide stated items to multiple receivers and categories thereof within an entity such as a large hotel, hotel/casino, spa, etc. in a convenient, flexible and expeditious manner. For example, the selector can be in a single location (e.g., their hotel room) and select multiple receivers (including those whom they have not come in personal contact with) to receive stated items for a single or periodic timeframe while allowing the receivers to conveniently collect the stated items.

Figure 3:
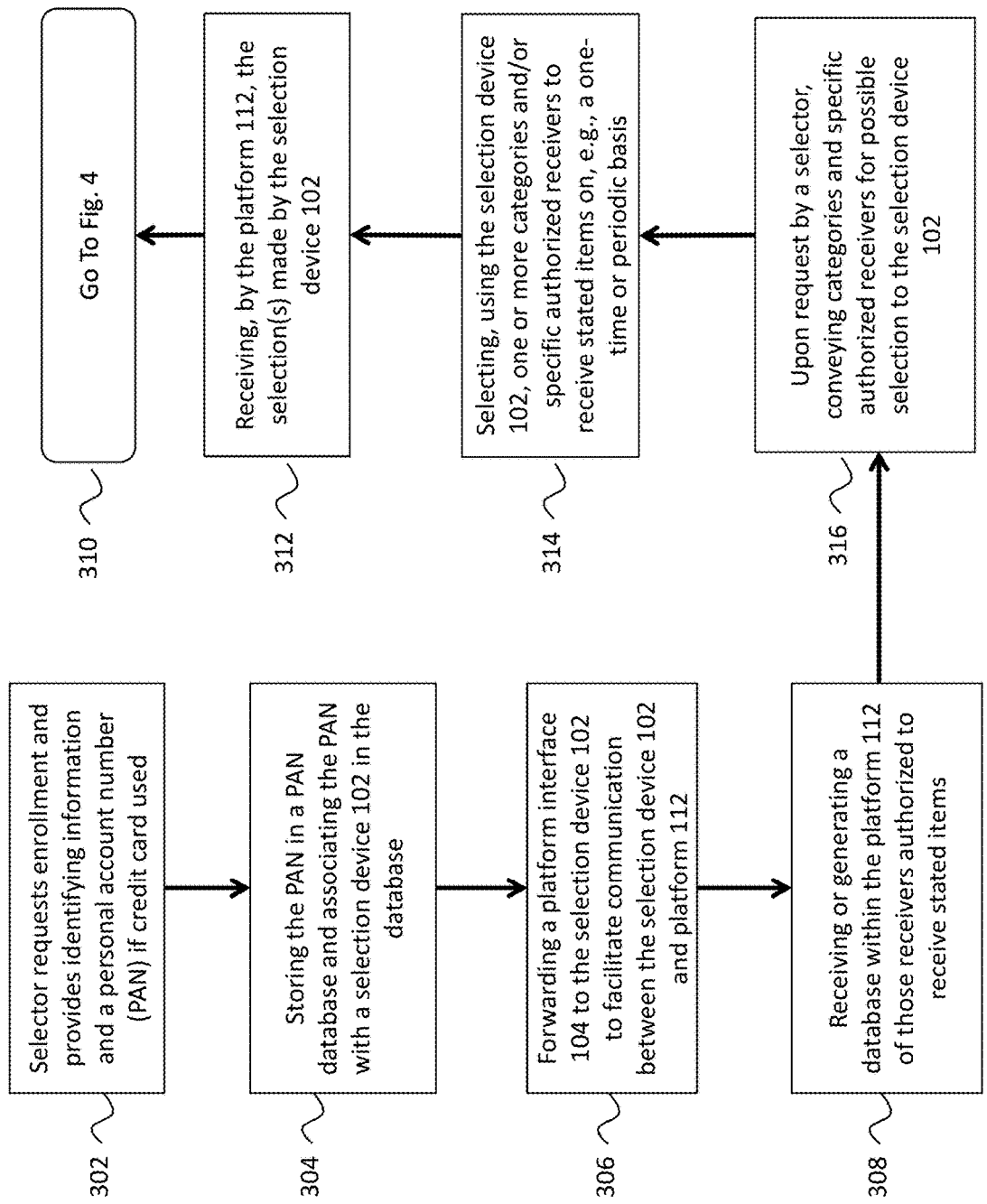
FIGS. 3 and 4 depict a method for generating and selecting receivers in accordance with embodiments.
Figure 4:
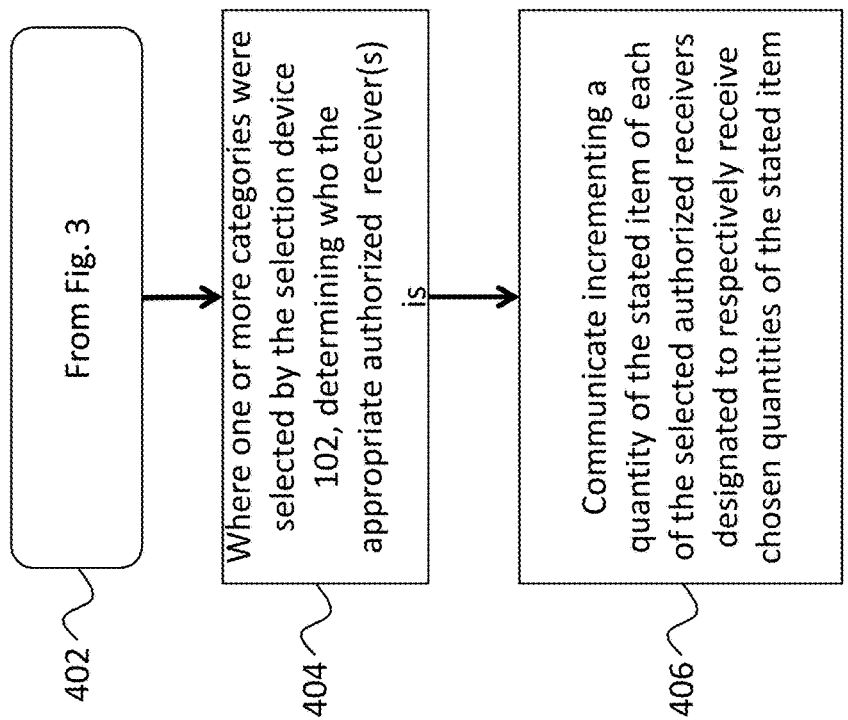

An example method for generating and selecting receivers in accordance with embodiments is now described with regard to FIGS. 3 and 4. Referring first to FIG. 3, a selector requests enrollment (using enrollment system 120) and provides identifying information as well as a PAN if a credit or debit card used, as indicated by a block 302. Where a PAN has been received, the PAN is then stored in a PAN database (not shown) and is associated with a selector's selection device, as indicated by a block 304. In this way, when the selector selects a receiver for receipt of a stated item such as a remunerated amount, that amount can automatically be deducted from an account belonging to the selector.

Once the selector has been enrolled by the enrollment system 120, a platform interface 104 (e.g., an app), is then forwarded for installation to the selector's selection device 102 to facilitate communication between the selection device 102 and platform 112, as indicated by a block 306. Once the selector has received the platform interface, s/he is then able to select authorized receivers to receive stated items in the manner described herein.

Before, after or concurrently with the selector requesting enrollment as described above, a database is generated or received (based on employee and scheduling information from the entity) within the platform 112 of those receivers authorized to receive stated items. This is indicated by a block 308. In embodiments, this database is updated as needed to account for different employees being on duty at different times and for employees that are newly hired and that depart from employment with the entity. As part of this, in embodiments, a set of authorized receivers is also generated from this database and represents a subset of the database that is custom to a particular selector or group of selectors.

When the selector is ready to make a selection, the selection process can be initiated in any number of ways. For example, it can be initiated by the selector by using the platform interface 104 of the selection device 102 in conjunction with scanning a video screen of, e.g., a hotel room (where the appropriate screen can be found on a specified channel). Scanning this code ultimately facilitates the conveyance of the appropriate categories and specific authorized receivers (directly or indirectly) for possible selection to the selection device 102, as indicated by a block 316. As an example, a scan of the code by the selection device 102 may initiate a procedure within the selection device 102 of downloading the categories and/or authorized receivers from the platform 112 to the selection device 102. More specifically, the conveyance of the categories and receivers can be facilitated directly by the code itself (i.e., the code contains the categories and authorized receivers) or the code can contain information for the platform interface 104 to then receive the list of categories and authorized receivers from the platform 112 via network 108 utilizing any number of mechanisms known in the art.

In addition to utilizing a video screen to initiate the selection process, in embodiments, any number of other sources of information that can be identified by the selection device 102 and platform interface 104 are contemplated. In addition, the timing of the initiation can be timed to when a specific authorized receiver has completed an action for which they are authorized to receive the stated item.

Once the receiver has received the set of authorized receivers, they can then select, using the selection device 102, one or more categories and/or specific authorized receivers to receive stated items on, e.g., a one-time or periodic basis. This is indicated by a block 314. The platform 112 then receives the selection(s) made by the selector via the selection device 102, as indicated by a block 312.

Referring now to FIG. 4, where one or more categories were selected by the selection device 102, a determination is made as to who the appropriate authorized receiver(s) are, as indicated by a block 404. In embodiments, as indicated above, this is done by selection analysis engine 122 and category/authorized receiver translator 124. Authorizing the incrementing (e.g., transfer from the selector's account) of a quantity of the stated item for each of the selected authorized receivers is then communicated, as indicated by a block 406. For example, a communication is sent to increment a stated item repository such as a receiver's savings account or prepaid vehicle (e.g., prepaid card).

While the steps in FIG. 4 have been depicted and described in a particular order, it should be understood that this is by way of example and that, in embodiments, the steps can be ordered differently with various aspects being deleted and/or added.

Figure 5:
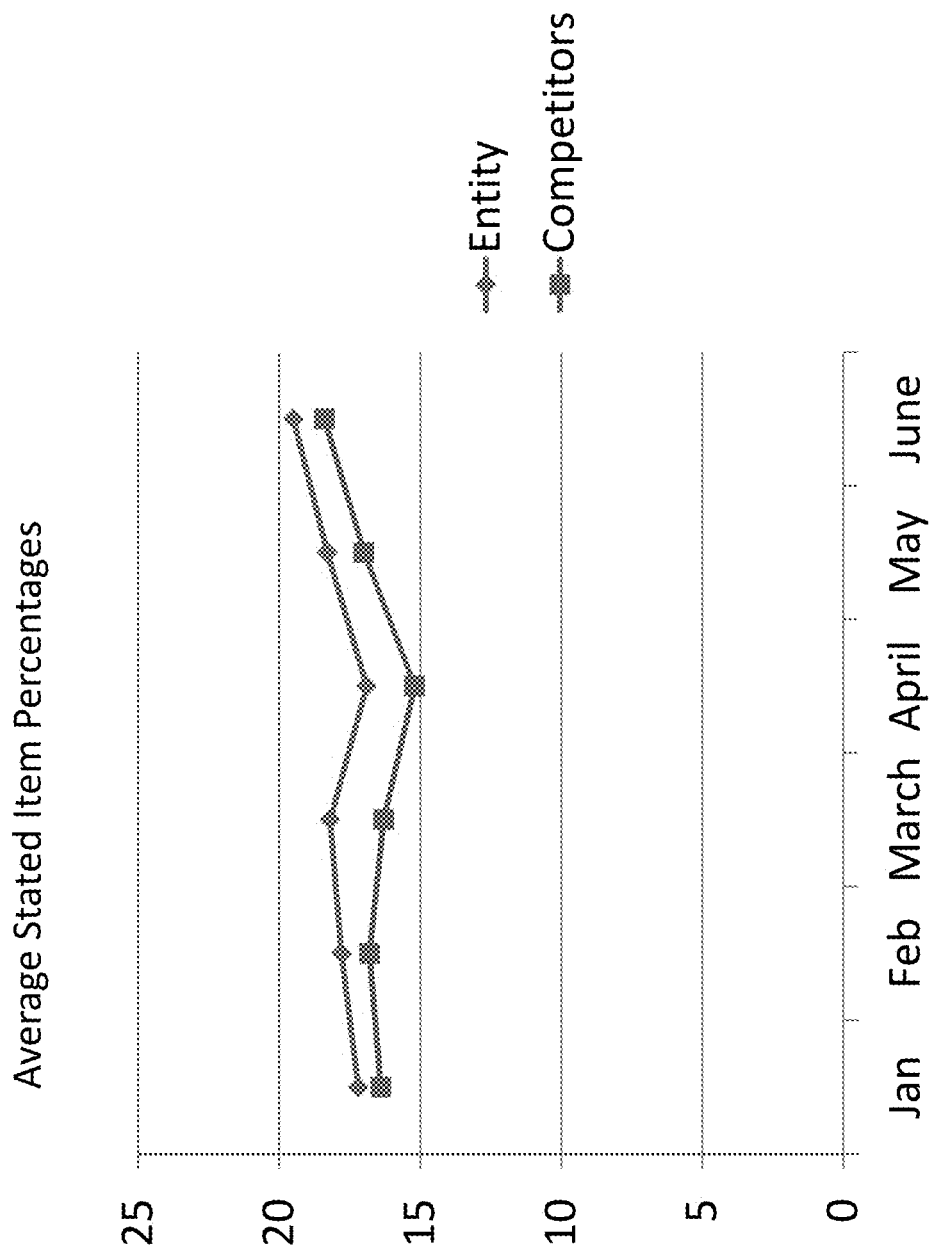
FIG. 5 is an example diagram depicting a comparison of average stated item percentages of entities, in accordance with embodiments.

As mentioned above, in embodiments, the amount of a stated item that a given receiver receives over a period of time can be compared with an amount received by other receivers (individually or collectively). It is envisioned that this comparison can be made in any number of ways. For example, the average amount received per hour worked by a given maid over a set period of weeks can be compared with the average amount received per hour worked by other maids (individually or collectively) over a like period. In some instances, this can be used as an indication of how well a particular employee is performing. In addition, the average collective receipt of stated items (of all or certain types of receivers) within an entity can be compared with competitive entity over a period of time. An example chart depicting this as a percentage of a total amount paid (e.g., for a tip given to a waiter) over a several month period of time is shown in FIG. 5.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A platform server for facilitating automated distribution of a stated item to a plurality of authorized receivers associated with an entity, comprising software that, when executed by a digital processor, causes the digital processor to perform a set of operations comprising:
   receiving, from an entity input device, at least one of a category of receiver or two or more authorized receivers authorized to receive the stated item;
   receiving, from the entity input device, an indication that one receiver from the at least one of the category of receiver or the two or more authorized receivers completed an action for which they are authorized to receive the stated item;
   generating a first electronic signal, receivable by a selection device, for conveying a selection option set containing at least one of the category of receiver and the two or more authorized receivers, wherein generating the first electronic signal is initiated in response to receiving the indication;
   receiving, from the selection device, a second electronic signal indicating a selection from the selection option set of at least one of the category of receiver and two of the two or more authorized receivers,
      where the category of receiver is selected, identifying one or more selected authorized receivers associated with the category of receiver that is selected, and
      the second electronic signal further indicating a quantity of the stated item conveyed by the selection device corresponding to each selected authorized receiver of the one or more selected authorized receivers that are identified; and
   communicating, for the each selected authorized receiver, the quantity of the stated item conveyed by the selection device to a stated item repository corresponding to the each selected authorized receiver.

2. The platform server of claim 1, wherein identifying the selected authorized receiver associated with the category of receiver that is selected comprises evaluating a timeframe of receipt of the second electronic signal and a location at which the first electronic signal is received by the selection device.

3. The platform server of claim 1, wherein said first electronic signal is initiated upon the selection device scanning a code on a video screen.

4. The platform server of claim 3, wherein the code is a QR code.

5. The platform server of claim 1, wherein said second electronic signal indicates that at least one selected category or the one or more selected authorized receivers that are to receive the stated item periodically.

6. The platform server of claim 1, further comprising:
   an application program interface configured to provide access to the selection device via a network.

7. The platform server of claim 1, wherein the quantity of the stated item received by at least one of the one or more selected authorized receivers is compared with the quantity of the stated item received by at least one other selected authorized receiver over a predetermined time period, wherein a resultant comparison is generated for display.

8. The platform server of claim 1, wherein a cumulative quantity of stated items received by the two or more authorized receivers associated with the entity is compared with a cumulative quantity of stated items received by two or more receivers associated with a different entity, wherein a resultant comparison is generated for display.

9. The platform server of claim 1, wherein the stated item repository is a prepaid vehicle.

10. The platform server of claim 1, wherein a type of stated item is selectable by the selection device.

11. The platform server of claim 1, wherein the at least one of the category of receiver or the two or more authorized receivers is only the category of receiver, and wherein identities of some or all authorized receivers associated with the category of receiver are unknown to a user of the selection device.

12. A method for facilitating automated distribution of a stated item to a plurality of receivers associated with an entity, the method comprising:
   receiving, with a platform server, an enrollment signal from a selection device to enroll at least one of the selection device and a selector, the enrollment signal containing a unique identifier;
   generating, with the platform server, a database containing two or more authorized receivers, wherein the two or more authorized receivers are a subset of the plurality of receivers associated with the entity;
   receiving, with the platform server, an indication that one receiver from the two or more authorized receivers completed an action for which they are authorized to receive the stated item;
   generating, with the platform server, a first electronic signal, receivable by the selection device, for conveying a selection option set containing at least the two or more authorized receivers, wherein generating the first electronic signal is initiated in response to receiving the indication;
   receiving, with the platform server, a second electronic signal from the selection device, the second electronic signal indicating a selection from the selection option set of the two or more authorized receivers, wherein a quantity of the stated item conveyed by the selection device and corresponding to each selected authorized receiver is identified; and
   communicating, with the platform server, for the each selected authorized receiver, the quantity of the stated item conveyed by the selection device to a stated item repository corresponding to the each selected authorized receiver.

13. The method of claim 12, wherein the database is generated to further include at least one category of authorized receivers, wherein the first electronic signal further includes the at least one category of authorized receivers, where a category of receiver is selected, identifying the each selected authorized receiver associated with the category of receiver that is selected.

14. The method of claim 12, wherein identifying the each selected authorized receiver associated with the category of receiver that is selected comprises evaluating a timeframe of receipt of the second electronic signal and a location at which the first electronic signal is received by the selection device.

15. The method of claim 12, wherein said first electronic signal is also initiated upon the selection device scanning a code on a video screen.

16. The method of claim 15, wherein the code is a QR code.

17. The method of claim 12, wherein said second electronic signal indicates that at least one selected category or the each selected authorized receiver is to receive the stated item periodically.

18. The method of claim 12, providing access, with the platform server, to the selection device via an application program interface and a network.

19. A non-transitory computer-readable medium for facilitating automated distribution of a stated item to two or more receivers associated with an entity, comprising software that, when executed by a digital processor, causes the digital processor to perform a set of operations comprising:

receiving, from an entity input device, at least one of a category of receiver and two or more authorized receivers authorized to receive the stated item;

receiving, from the entity input device, an indication that one receiver from the at least one of the category of receiver or the two or more authorized receivers completed an action for which they are authorized to receive the stated item;

generating a first electronic signal, receivable by a selection device, for conveying a selection option set containing at least one of the category of receiver and the two or more authorized receivers, wherein generating the first electronic signal is initiated in response to receiving the indication;

receiving, from the selection device, a second electronic signal indicating a selection from the selection option set of at least one of the category of receiver and two of the two or more authorized receivers, where the category of receiver is selected, identifying one or more selected authorized receivers associated with the category of receiver that is selected, and wherein a quantity of the stated item conveyed by the selection device and corresponding to each selected authorized receiver of the or more selected authorized receivers that are identified; and communicating, for the each selected authorized receiver, the quantity of the stated item conveyed by the selection device to a stated item repository corresponding to the each selected authorized receiver.

20. The non-transitory computer-readable medium of claim 19, wherein said second electronic signal indicates that at least one selected category or the one or more selected authorized receivers are to receive the stated item periodically.

* * * * *